(12) United States Patent
Stecher et al.

(10) Patent No.: US 7,779,116 B2
(45) Date of Patent: Aug. 17, 2010

(54) SELECTING SERVERS BASED ON LOAD-BALANCING METRIC INSTANCES

(75) Inventors: John Joseph Stecher, Rochester, MN (US); Robert Wisniewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1178 days.

(21) Appl. No.: 11/351,242

(22) Filed: Feb. 9, 2006

(65) Prior Publication Data

US 2007/0185997 A1   Aug. 9, 2007

(51) Int. Cl.
    *G06F 15/16* (2006.01)
(52) U.S. Cl. .................. 709/224; 709/228; 709/241
(58) Field of Classification Search ......... 709/225–226, 709/229
    See application file for complete search history.

(56) References Cited

U.S. PATENT DOCUMENTS

| 6,658,473 | B1 | 12/2003 | Block et al. | |
| 2002/0099970 | A1* | 7/2002 | Zhao et al. | ...... 714/4 |
| 2005/0198335 | A1* | 9/2005 | Brown et al. | ...... 709/229 |
| 2006/0168223 | A1* | 7/2006 | Mishra et al. | ...... 709/225 |
| 2007/0156869 | A1* | 7/2007 | Galchev et al. | ...... 709/223 |

FOREIGN PATENT DOCUMENTS

EP    1049307 A1   11/2000

OTHER PUBLICATIONS

Anna Hac, Xiaowei Jin, Dynamic Load Balancing in a Distributed System Using a Sended-Initiated Algorithm, 1988 IEEE, pp. 172-180.*

* cited by examiner

*Primary Examiner*—Patrice Winder
(74) *Attorney, Agent, or Firm*—Owen J. Gamon

(57) ABSTRACT

In an embodiment, a request is received that is directed to a page. A determination is made whether a session associated with the request already exists by determining whether the request is dependent on a previous request. If the session does not already exist, then a decision is made whether the request will result in creating a session. If the request will result in creation of a session, then a server is selected based on a load-balancing metric instance associated with the page, and the request is sent to the selected server. The load-balancing metric instance has an algorithm and an input parameter to the algorithm. The server is selected by executing the algorithm and selecting the server identified by an output parameter from the algorithm.

14 Claims, 4 Drawing Sheets

SELECTING SERVERS BASED ON LOAD-BALANCING METRIC INSTANCES

FIELD

An embodiment of the invention generally relates to computers. In particular, an embodiment of the invention generally relates to load balancing requests between servers based on instances of load-balancing metrics.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware (such as semiconductors, integrated circuits, programmable logic devices, programmable gate arrays, and circuit boards) and software, also known as computer programs.

Years ago, computers were isolated devices that did not communicate with each other. But, today computers are often connected in networks, such as the Internet or World Wide Web, and a user at one computer, often called a client, may wish to access information at or send requests for services to multiple other computers, often called servers, via a network. Companies often use multiple servers to respond to requests from clients and replicate their data across the multiple servers, in order to provide enhanced performance, reliability, and the ability to respond to a variable rate of requests from clients. The multiple servers often contain programs called application servers, which execute applications and provide services for security, data access, and persistence. The client is typically unaware of the existence of the multiple servers, and instead sends its request to a single server, which selects one of the application servers to process the request and routes the request to the selected application server.

Several different types of algorithms are currently used to select which server, and thus which application server, receives which request. In a first example, a load-balancing algorithm distributes incoming requests to multiple servers, so that each server has roughly the same workload. But, some requests are related to each other (e.g., are part of the same transaction) and need to be processed by the same application server. Thus, in a second example, a temporary affinity algorithm, e.g. based on HTTP (Hypertext Transport Protocol) cookies or URL (Uniform Resource Locator) re-writing, routes all requests that are associated with a single transaction to the server where the transaction started. Further, in a third example, a cached session-state algorithm routes requests from clients to the server where that client's state (e.g., a hypertext transport protocol session state) is currently cached.

Unfortunately, the three example load-balancing algorithms mentioned above do not have knowledge of the application server logic, so transactions that have multiple associated long-running requests can quickly cause the system to become unbalanced due to a non-optimal load-balancing of the session-creating requests. This may result in one or more servers becoming overloaded and experiencing degraded performance, while other servers may be underutilized.

Without a better way to distribute requests across multiple servers, users will continue to suffer from degraded performance.

SUMMARY

A method, apparatus, system, and signal-bearing medium are provided. In an embodiment, a request is received that is directed to a page. A determination is made whether a session associated with the request already exists by determining whether the request is dependent on a previous request. If the session does not already exist, then a decision is made whether the request will result in creating a session. If the request will result in creation of a session, then a server is selected based on a load-balancing metric instance associated with the page, and the request is sent to the selected server. The load-balancing metric instance has an algorithm and an input parameter to the algorithm. The server is selected by executing the algorithm and selecting the server identified by an output parameter from the algorithm. In this way, requests associated with different sessions may be distributed to servers using load-balancing metrics instances that are independent of each other.

DETAILED DESCRIPTION

Figure 1:
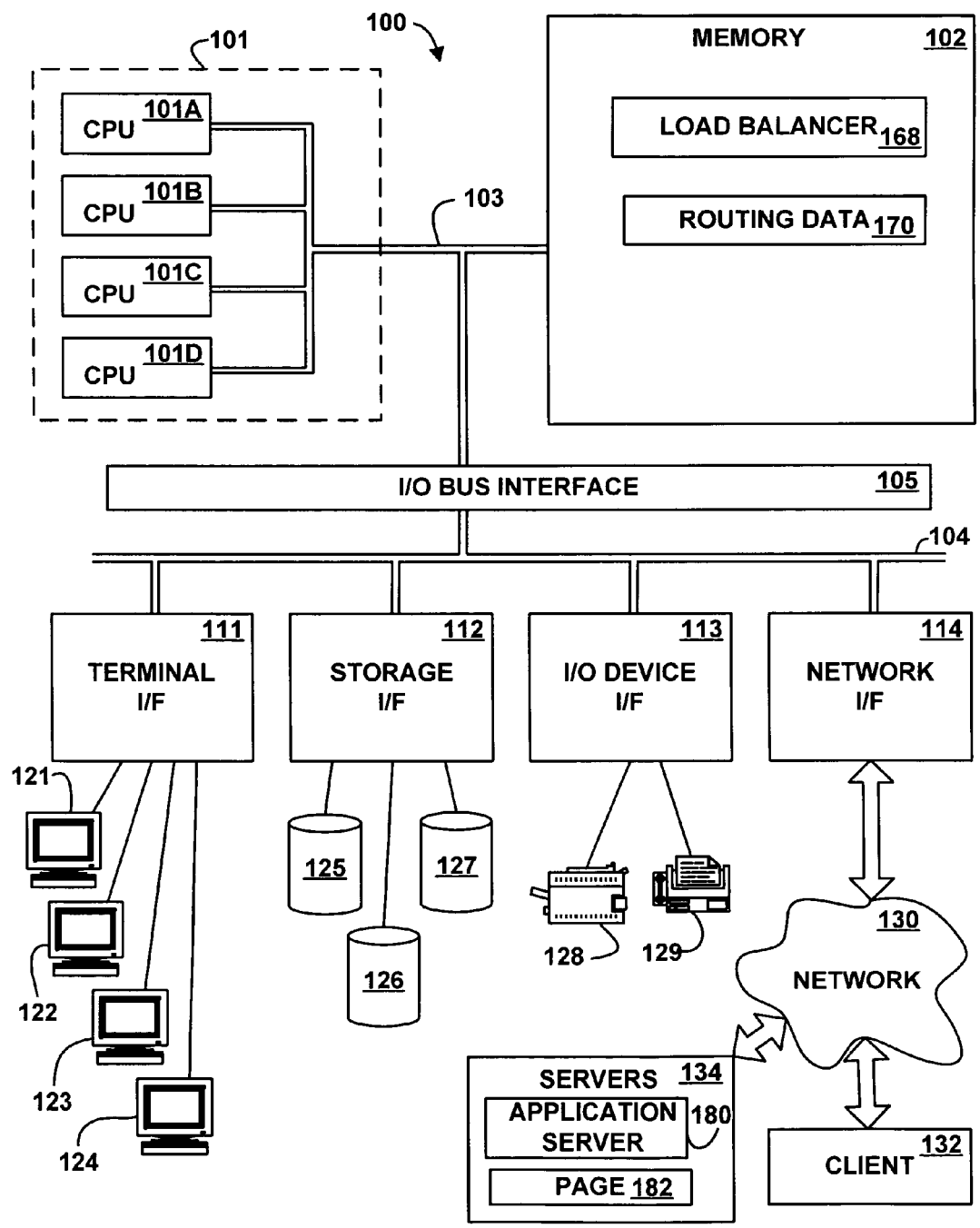
FIG. 1 depicts a block diagram of an example system for implementing an embodiment of the invention.

Referring to the Drawings, wherein like numbers denote like parts throughout the several views, FIG. 1 depicts a high-level block diagram representation of a computer system 100 connected to client computer systems 132 and server computer systems 134 via a network 130, according to an embodiment of the present invention. The terms "client" and "server" are used for convenience only, and a computer that acts as a client in one embodiment may act as a server in another, and vice versa. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments, the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a load balancer 168 and routing data 170. Although the load balancer 168 and the routing data 170 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the load balancer 168 and the routing data 170 are all illustrated as being contained within the memory 102 in the computer system 100, these elements are not necessarily all completely contained in the same storage device at the same time.

The load balancer 168 receives requests from the clients 132 and selects a server 134 to process each respective request from among multiple servers (often organized as a cluster) based on the routing data 170. The routing data is further described below with reference to FIG. 2. In an embodiment, the load balancer 168 includes instructions capable of executing on the processor 101 or statements capable of being interpreted by instructions executing on the processor 101 to perform the functions as further described below with reference to FIG. 3. In another embodiment, the load balancer 168 may be implemented in microcode. In another embodiment, the load balancer 168 may be implemented in hardware via logic gates and/or other appropriate hardware techniques in lieu of or in addition to a processor-based system.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127, which are typically rotating magnetic disk drive storage devices, although they could alternatively be other devices, including arrays of disk drives configured to appear as a single large storage device to a host. The contents of the DASD 125, 126, and 127 may be loaded from and stored to the memory 102 as needed. The storage interface unit 112 may also support other types of devices, such as a diskette device, a tape device, an optical device, or any other type of storage device.

The I/O device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types.

The network interface 114 provides one or more communications paths from the computer system 100 to other digital devices and computer systems; such paths may include, e.g., one or more networks 130. In various embodiments, the network interface 114 may be implemented via a modem, a LAN (Local Area Network) card, a virtual LAN card, or any other appropriate network interface or combination of network interfaces.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a firewall, router, Internet Service Provider (ISP), personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100, the client 132, and/or the servers 134. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The client 132 may further include some or all of the hardware components previously described above for the computer system 100. Although only one client 132 is illustrated, in other embodiments any number of clients may be present. The client 132 sends requests for pages with addresses of the pages to be retrieved to the computer system 100. Although the client 132 is illustrated as being a separate entity from the computer system 100, in another embodiment, the client 132 may be part of the computer system 100, e.g., another program within the memory 102 that executes on the processor 101 in the computer system 100.

The servers 134 include application servers 180 and pages 182. The servers 134 may further include some or all of the hardware components previously described above for the computer system 100. In an embodiment, the application server 180 includes instructions capable of executing on a processor, analogous to the processor 101, or statements capable of being interpreted by instructions executing on a processor 101 to perform the functions as further described below with reference to FIG. 4. In another embodiment, the application server 180 may be implemented in microcode. In yet another embodiment, the application server 180 may be implemented in hardware via logic gates and/or other appropriate hardware techniques, in lieu of or in addition to a processor-based system.

The page 182 may be stored as a file, database, table, field, record, entry, or in any appropriate format. The page 182 may include any appropriate content, such as code, instructions, statements, data, control tags, text, video, audio, graphics, or any portion, multiple, or combination thereof. Further, the page 182 may follow the HTML (Hypertext Markup Language), XML (Extensible Markup Language), or any appropriate protocol or standard.

It should be understood that FIG. 1 is intended to depict the representative major components of the computer system 100, the network 130, the clients 132, and the servers 134 at a high level, that individual components may have greater complexity than represented in FIG. 1, that components other than, fewer than, or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100 and/or the servers 134, and that, when read and executed by one or more processors in the computer system 100 and/or the servers 134, cause the computer system 100 and/or the servers 134 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 and/or the servers 134 via a variety of tangible signal-bearing media that may be operatively or communicatively connected (directly or indirectly) to the processor, e.g., the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 and/or the servers 134 by a communications medium, such as through a computer or a telephone network, e.g., the network 130, including wireless communications.

Such tangible signal-bearing media, when encoded with or carrying computer-readable and executable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
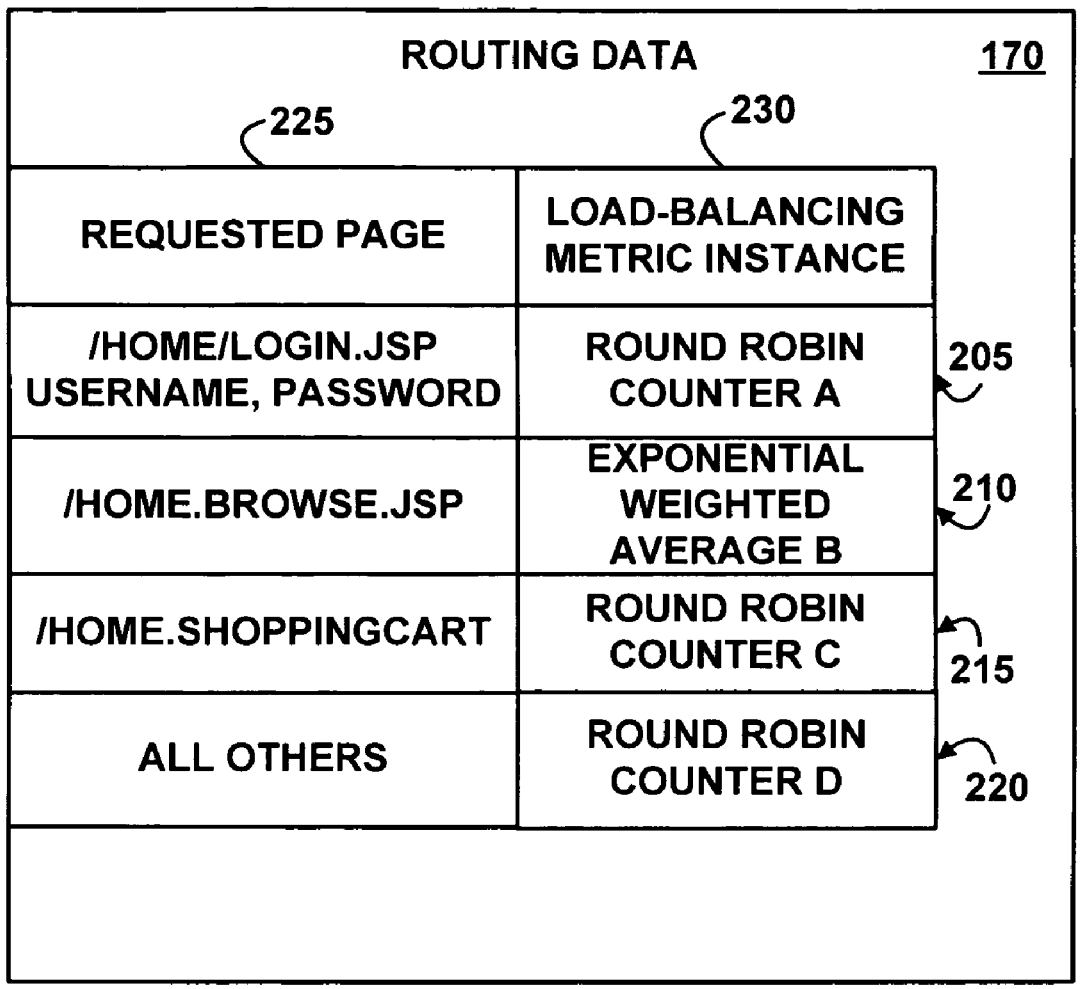
FIG. 2 depicts a block diagram of an example data structure for routing data, according to an embodiment of the invention.

FIG. 2 depicts a block diagram of an example data structure for the routing data 170, according to an embodiment of the invention. The routing data 170 includes example records 205, 210, 215, and 220, each of which includes an example requested page field 225 and example load-balancing metric instance field 230.

The requested page field 225 identifies the page 182 that a request from a client 132 requested to be retrieved. In various embodiments, the requested page 225 may be identified by an address, such as a URL (Uniform Resource Locator), URI (Uniform Resource Indicator), any other type of address. Further, the address of the requested page 225 may be partially qualified or fully qualified, e.g., the address of the requested page 225 may specify a name of a file, a type or extension, a subdirectory, a directory, or any portion, multiple, or combination thereof. In addition, the address of the page 225 may be relative or absolute, may specify a location a database row or record, a file, a record, or any other location, or may include search or query terms to use in searching for the page 182. In various embodiments, a particular page 182 identified by the requested page field 225 may be present on one, some, or all of the servers 134, or may be capable of being retrieved by all application servers 180 regardless of on which server 134 that particular page 182 is located.

The load-balancing metric instance field 230 identifies a technique for selecting the server 134 to receive the request that requests, or is directed to, the requested page 225. The load-balancing metric instance field 230 identifies an algorithm and a variable or variables that are used as input and output parameters to/from the algorithm. If only a single variable, is present, the same variable may be used as both an input and an output parameter. The load-balancing metric instance field 230 may have any number of input variables/parameters and any number of output variables/parameters.

The input parameter contains a value that represents a previous server 134 that received the previous request that requested the page identified by the associated requested page field 225. The output parameter contains a value the represents the next server 134 that is to receive the next request that requests the page identified by the associated requested page field 225. The identified algorithm transforms the input parameter into the output parameter, i.e., the identified algorithm transforms an identification of the previous server into an identification of the next server to receive a request that requests the page identified by the associated requested page field 225. Thus, the output parameter for one request to a page becomes the input parameter for the next request to that page.

For example, records 205, 215, and 220 all specify a "round robin" algorithm, but different variables: "counter a," "counter c," and "counter d," respectively. A "round robin" algorithm rotates the server that receives the current request from one server to the next server, in turn, until all servers have received a request, and then the round robin algorithm starts over the rotation of the servers from the beginning. For example, if a cluster of servers 134 includes ten servers, then the "round robin algorithm" that uses the "counter a" (record 205) may, e.g., add 1 to the variable "counter a" mod 10, so that "counter a" contains a value from 1 to 10, representing each of the servers 134 in turn. Although records 215 and 220 also specify the same round robin algorithm, records 215 and 220 specify different variables from record 205: "counter c" and "counter d," respectively. Thus, although "counter a," "counter c," and "counter d" all have values from 1 to 10, and are all transformed via the same round robin algorithm, at any one time "counter a," "counter b," and "counter c" might have different values, so that different requests directed to the different requested pages 225 (specified in different of the records 205, 215, and 220) at any one time might be sent to different servers 134.

The different instances of the load-balancing metrics operate independently of each other, so that a request that requests a particular page 225 that uses a particular load-balancing metric 230 does not impact which server is next selected by a different load-balancing metric instance. For example, requests that request the "/home/login.jsp" page with parameters of username and password (record 205) do not impact the selection of which server is next selected for requests directed to the "/home.shoppingcart" page (record 215) even though these requests both use the round robin algorithm because they are different instances and use different variables ("counter a" versus "counter c").

The "round robin" algorithm is exemplary only, and other algorithms to select the next server may be used, such as a weighted average, an exponential weighted average (record 210), or any other appropriate algorithm.

One of the records, the record 220, includes a requested page 225 of "all others," indicating that the record 220 is to be used when the page requested by the request is not specifically identified in the routing data 170. Thus, the load-balancing metric instance 230 in the record 220 is the default load-balancing metric instance, which the load balancer 168 uses for requested pages that are not explicitly identified by the requested page field 225.

Figure 3:
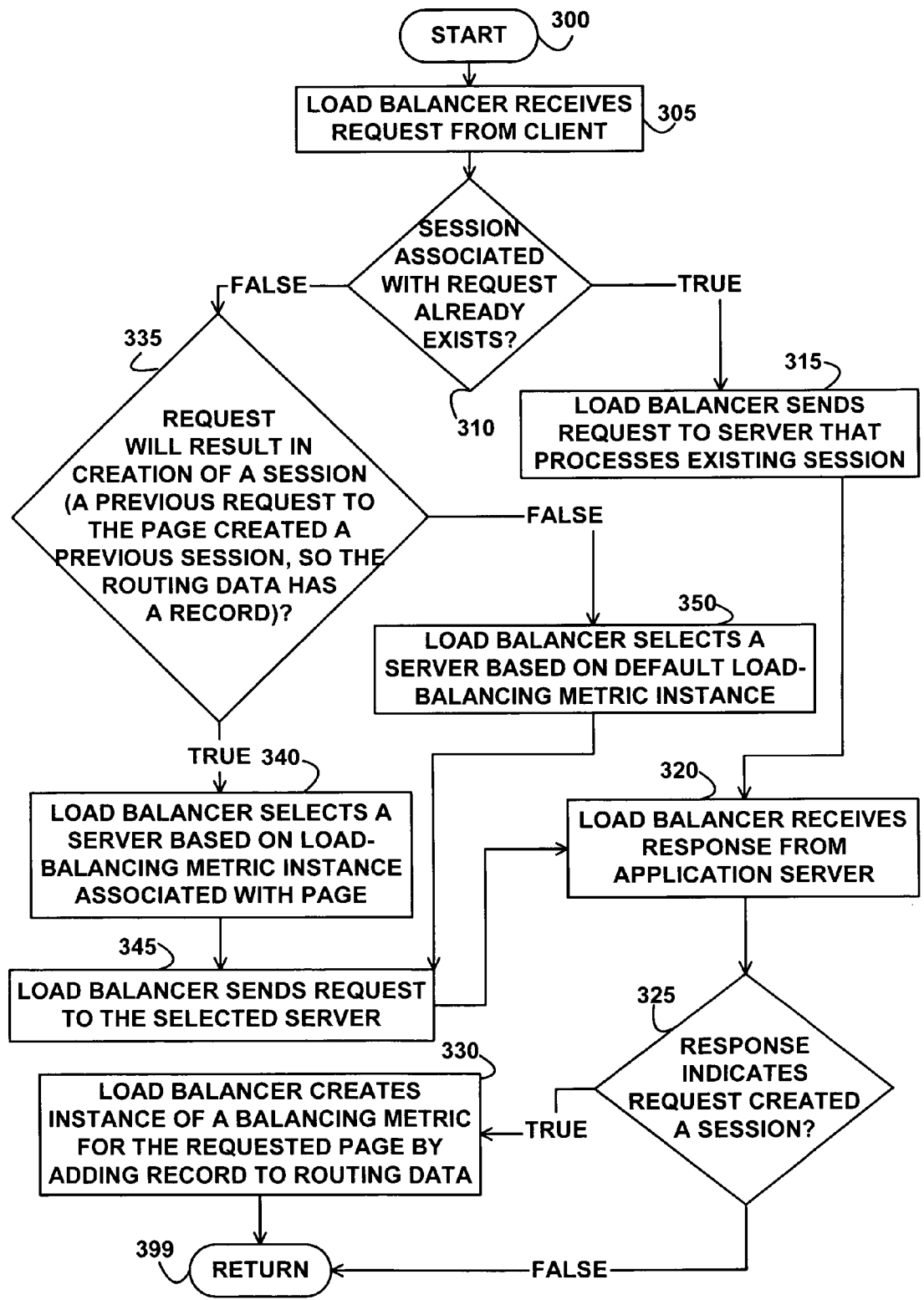
FIG. 3 depicts a flowchart of example processing for distributing requests to servers, according to an embodiment of the invention.

FIG. 3 depicts a flowchart of example processing for distributing requests to the servers 134 by the load balancer 168. Control begins at block 300. Control then continues to block 305 where the load balancer 168 receives a request from the client 132.

Control then continues to block 310 where the load balancer 168 determines whether a session associated with the received request already exists. A session represents an active connection between the client 132 and an application server 180, which causes different requests to be related to each other, so that the different but related requests in the session are sent to the same server 134, as further described below. Requests are related if they are part of the same transaction or operation and are dependent on each other, i.e., a current request is dependent on the output, result, or existence of a previous request. For example, a request from the client 132 to the application server 180 to pay for an item in a shopping cart is dependent on a previous request to add the item from a catalog to the shopping cart, which is dependent on a previous request to browse the catalog, so these requests are dependent on and related to each other, so they are a part of the same session and are sent to the same server 134, so that they may be processed by the same application server 180. Thus, the current request is associated with a session that already exists if the current request is related to at least one previous request that was processed or is being processed by an application server 180 at a server 134, and the current request needs to be processed by the same application server 180 at the same server 134 as the previous request.

If the determination of block 310 is true, then a session associated with the received request already exists, so control continues to block 315 where the load balancer 168 sends the received request to the server 134 that is already processing the existing session (the same server that processed the previous related requests in the existing session). The application server 180 at the server 134 that is already processing the existing session processes the request, as further described below with reference to FIG. 4.

Referring again to FIG. 3, control then continues to block 320 where the load balancer 168 receives a response from the application server 180, where the response is associated with the request that was sent at block 315. Control then continues to block 325 where the load balancer 168 determines whether the response indicates that the request resulted in the creation of a session.

If the determination of block 325 is true, then the response indicates that the request resulted in the creation of a session, so control continues to block 330 where the load balancer 168 creates an instance of a load balancing metric associated with the page of the request by adding a record for the page 225 that was requested by the request that created the session and a load-balancing metric instance 230 to the routing data 170. Control then continues to block 399 where the logic of FIG. 3 returns.

If the determination of block 325 is false, then the response does not indicate that the request resulted in the creation of a session, so control continues to block 399 where the logic of FIG. 3 returns.

If the determination at block 310 is false, then a session associated with the request does not already exist, so control continues to block 335 where the load balancer 168 determines whether the request will result in creation of a session, that is, whether the request is directed to a requested page that is specified by a requested page field 225 in a record in the routing data 170. Because records are added to the routing data 170 in response to the creation of sessions (as previously described above with reference to blocks 325 and 330), the determination of block 335 determines whether a previous request was directed to the same page as the current request, and that previous request created a previous session. The current request is, however, not associated with the previous session because block 335 is on the "false" leg of block 310.

If the determination of block 335 is true, then the request will result in creation of a session, so control continues to block 340 where the load balancer 168 selects a server 134 based on the load-balancing metric instance 230 associated with the requested page 225 (based on the algorithm and the input parameter variable specified by the load-balancing metric instance). The load balancer 168 executes the algorithm and passes the input parameter variable the algorithm. The algorithm produces an identification of the selected server as an output parameter, which may be the same variable as the input parameter or a different variable. The load balancer 168 passes as the input parameter, the output parameter from a previous execution of the algorithm identified by the load-balancing metric instance.

Control then continues to block 345 where the load balancer 168 sends the request to the selected server identified by the output parameter of the algorithm of the load-balancing metric instance 230. The application server 180 at the selected server 134 receives and processes the request as further described below with reference to FIG. 4. Referring again to FIG. 3, control then continues to block 320, as previously described above.

If the determination at block 335 is false, then the received request will not result in creation of a new session, so control continues to block 350 where the load balancer 168 selects a server 134 based on a default load-balancing metric instance (based on the algorithm and variable specified by the default load-balancing metric instance), such as that illustrated in record 220 of the routing data 170. Control then continues to block 345 where the load balancer 168 sends the request the selected server. Control then continues to block 320, as previously described above.

Figure 4:
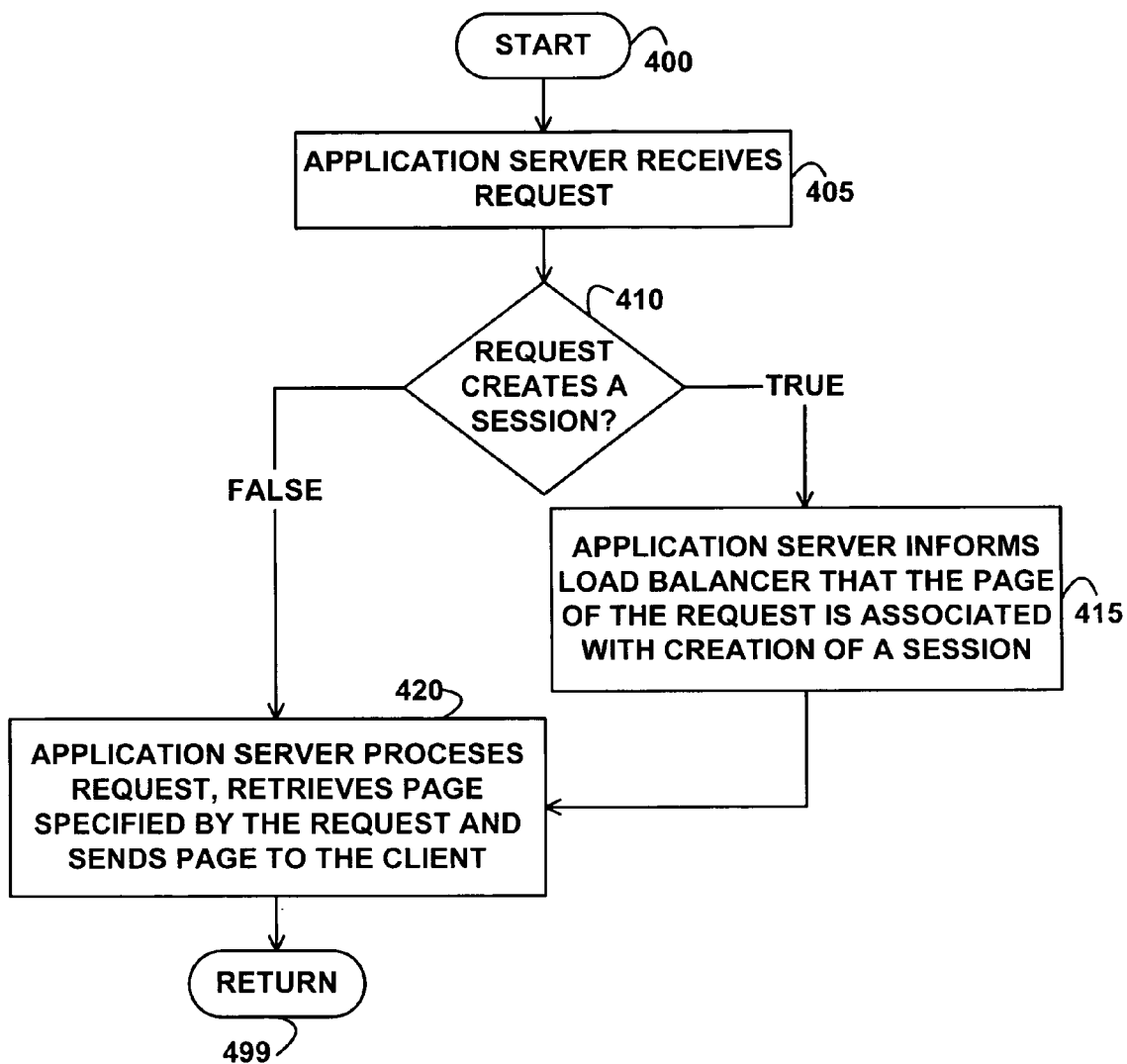
FIG. 4 depicts a flowchart for processing requests at servers, according to an embodiment of the invention.

FIG. 4 depicts a flowchart for processing requests by the application server 180, according to an embodiment of the invention. Control begins at block 400. Control then continues to block 405 where the application server 180 receives a request from the load balancer 168.

Control then continues to block 410 where the application server 180 determines whether the received request results in the creation of a new session. In various embodiments, the determination of block 410 is based on the request, based on parameters of the request, based on the page 182 specified by the request, based on any other appropriate criteria, or based on any portion, combination, or multiple thereof. For example, if the request is a login request with user identifier and password parameters, then the application server 180 may determine that the current request creates a session and that future requests directed to the same page are related to the current request and should be considered part of the same session, in order to preserve the confidentiality of data associated with the page and/or with future requests. In contrast, as another example, if the request merely retrieves a page of informational text, the application server 180 may determine that the current request does not create a session and that future requests directed to the same page are not related to the current request, so they should not be considered part of the same session.

If the determination at block 410 is true, then the received request does result in the creation of a new session, so control continues to block 415 where the application server 180 sends a response to the load balancer 168 that informs the load balancer 168 that the page of the received request is associated with the creation of a new session. (The load balancer 168 receives and processes the response as previously described above with reference to block 320 of FIG. 3).

Referring again to FIG. 4, control then continues to block 420 where the application server 180 processes the request, retrieves the page 182 specified by the request, and sends the page 182 to the client 132. Control then continues to block 499 where the logic of FIG. 4 returns.

If the determination of block 410 is false, then the received request does not result in the creation of a new session, so control continues to block 420, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   receiving a current request from a client, wherein the current request specifies a first page;
   determining whether a first session associated with the current request already exists;
   if the determining is false, deciding whether the request will result in creation of a second session;
   if the deciding is true, selecting a first load-balancing metric instance associated with the first page from among a plurality of load-balancing metrics associated with a plurality of pages, wherein each of the plurality of pages is associated with a different of the plurality of load-balancing metrics, selecting a first server based on the first load-balancing metric instance associated with the first page, and sending the current request to the first server, wherein the first load-balancing metric instance comprises an algorithm and an input parameter to the algorithm and an output parameter from the algorithm, and wherein the selecting further comprises executing the algorithm, providing the input parameter to the algorithm, and performing the selecting the first server identified by the output parameter from the algorithm; and
   sending the first page to the client.

2. The method of claim 1, wherein the deciding further comprises:
deciding whether a previous request was directed to the first page and the previous request created a third session.

3. The method of claim 2, wherein the deciding further comprises:
deciding whether a response was received to the previous request, wherein the response indicated that the previous request created the third session.

4. The method of claim 1, further comprising:
if the determining is true, sending the current request to a second server that is associated with the first session.

5. The method of claim 1, wherein the selecting further comprises:
providing the output parameter from a previous execution of the algorithm as the input parameter to a current execution of the algorithm.

6. The method of claim 1, further comprising:
if the deciding is false, selecting a third server based on a default load-balancing metric instance, wherein the default load-balancing metric instance is not associated with the first page, and sending the current request to the third server.

7. A non-transitory computer-readable storage medium encoded with instructions, wherein the instructions when executed comprise:
receiving a current request from a client, wherein the current request specifies a first page;
determining whether a first session associated with the current request already exists, wherein the determining further comprises determining whether the current request is dependent on a previous request;
if the determining is false, deciding whether the request will result in creation of a second session;
if the deciding is true, selecting a first load-balancing metric instance associated with the first page from among a plurality of load-balancing metrics associated with a plurality of pages, where each of the plurality of pages is associated with a different of the plurality of load-balancing metrics, selecting a first server based on the first load-balancing metric instance associated with the first page, and sending the current request to the first server, wherein the first load-balancing metric instance comprises an algorithm and an input parameter to the algorithm and an output parameter from the algorithm, and wherein the selecting further comprises executing the algorithm, providing the input parameter to the algorithm, and performing the selecting the first server identified by the output parameter from the algorithm;
if the determining is true, sending the current request to a second server that is associated with the first session; and
sending the first page to the client.

8. The non-transitory computer-readable storage medium of claim 7, wherein the deciding further comprises:
deciding whether a previous request was directed to the first page and the previous request created a third session.

9. The non-transitory computer-readable storage medium of claim 8, wherein the deciding further comprises:
deciding whether a response was received to the previous request, wherein the response indicated that the previous request created the third session.

10. The non-transitory computer-readable storage medium of claim 7, wherein the selecting further comprises:
providing the output parameter from a previous execution of the algorithm as the input parameter to a current execution of the algorithm.

11. The non-transitory computer-readable storage medium of claim 7, further comprising:
if the deciding is false, selecting a third server based on a default load-balancing metric instance, wherein the default load-balancing metric instance is not associated with the first page, and sending the current request to the third server.

12. A method for configuring a computer, comprising:
configuring the computer to receive a current request from a client, wherein the current request specifies a first page;
configuring the computer to determine whether a first session associated with the current request already exists, wherein the configuring the computer to determine further comprises configuring the computer to determine whether the current request is dependent on a previous request;
configuring the computer to, if the determining is false, decide whether the request will result in creation of a second session, wherein the current request will result in the creation of a second session if a previous request was directed to the page and the previous request created a third session;
configuring the computer to, if the deciding is true, select a first load-balancing metric instance associated with the first page from among a plurality of load-balancing metrics associated with a plurality of pages, wherein each of the plurality of pages is associated with a different of the plurality of load-balancing metrics, select a first server based on the first load-balancing metric instance associated with the first page, and send the current request to the first server, wherein the first load-balancing metric instance comprises an algorithm and an input parameter to the algorithm and an output parameter from the algorithm, and wherein the select further comprises executing the algorithm, providing the input parameter to the algorithm, and performing the select of the first server identified by the output parameter from the algorithm;
configuring the computer to, if the determining is true, send the current request to a second server that is associated with the first session; and
configuring the computer to send the first page to the client.

13. The method of claim 12, wherein the configuring the computer to decide further comprises:
configuring the computer to decide whether a response was received to the previous request, wherein the response indicated that the previous request created the third session.

14. The method of claim 12, further comprising:
if the deciding is false, configuring the computer to select a third server based on a default load-balancing metric instance and send the current request to the third server, wherein the default load-balancing metric instance is not associated with the first page.

* * * * *